United States Patent
Patry et al.

(10) Patent No.: US 8,209,336 B2
(45) Date of Patent: Jun. 26, 2012

(54) DEVICE AND METHOD FOR EXTRACTING INFORMATION FROM A DATABASE, AND ASSOCIATED PRODUCTS

(75) Inventors: Nadine Patry, Rennes (FR); David Bihanic, Bouguenais (FR); Thierry Viellard, Osse (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1057 days.

(21) Appl. No.: 10/581,104

(22) PCT Filed: Nov. 26, 2004

(86) PCT No.: PCT/EP2004/053135
§ 371 (c)(1),
(2), (4) Date: May 1, 2007

(87) PCT Pub. No.: WO2005/055083
PCT Pub. Date: Jun. 16, 2005

(65) Prior Publication Data
US 2008/0040366 A1 Feb. 14, 2008

(30) Foreign Application Priority Data
Dec. 1, 2003 (EP) .................................. 03292999
Dec. 17, 2003 (FR) .................................. 03 14843

(51) Int. Cl.
*G06F 17/30* (2006.01)
(52) U.S. Cl. .................... 707/749; 707/750; 707/752
(58) Field of Classification Search .................. 707/749, 707/750, 737, 752
See application file for complete search history.

(56) References Cited

U.S. PATENT DOCUMENTS

| 4,905,163 | A | 2/1990 | Garber et al. |
| 7,268,791 | B1* | 9/2007 | Jannink .......................... 345/619 |
| 2001/0054183 | A1 | 12/2001 | Curreri |
| 2002/0040326 | A1* | 4/2002 | Spratt ............................. 705/26 |
| 2003/0020237 | A1* | 1/2003 | Boateng ........................ 273/272 |
| 2003/0163441 | A1 | 8/2003 | Godfredsen et al. |

FOREIGN PATENT DOCUMENTS
EP 0860786 8/1998
WO WO 01/35271 5/2001

OTHER PUBLICATIONS
Search Report Dated Feb. 25, 2005.

* cited by examiner

*Primary Examiner* — Phong Nguyen
*Assistant Examiner* — Dennis Myint
(74) *Attorney, Agent, or Firm* — Myers Wolin, LLC

(57) ABSTRACT

The invention relates to a device and a method for processing information of a database. The device consists of means for pre-defining at least one related area in a representation space comprising positions that can receive elements that are representative of the data, said space including at least one complementary area having no data representation. It also comprises means for specifying at least one data bootstrapping element for each related area, positioning the bootstrapping elements at bootstrapping positions in the related areas, successively determining new elements from elements already positioned, in accordance with at least one proximity order relation based on contents of the data, and successively positioning the new elements at positions neighboring the positions occupied by the data elements already positioned.

12 Claims, 13 Drawing Sheets

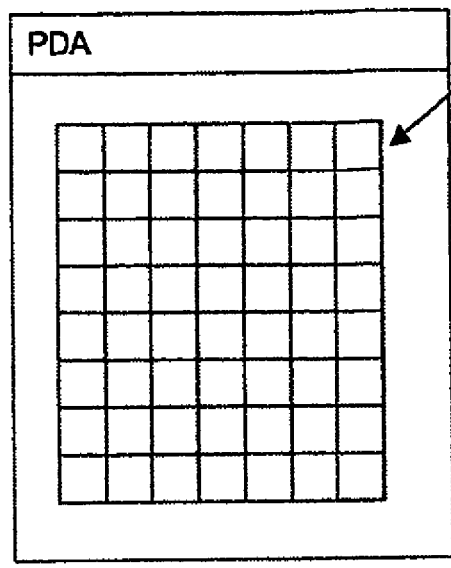
FIG. 12
FIG. 13
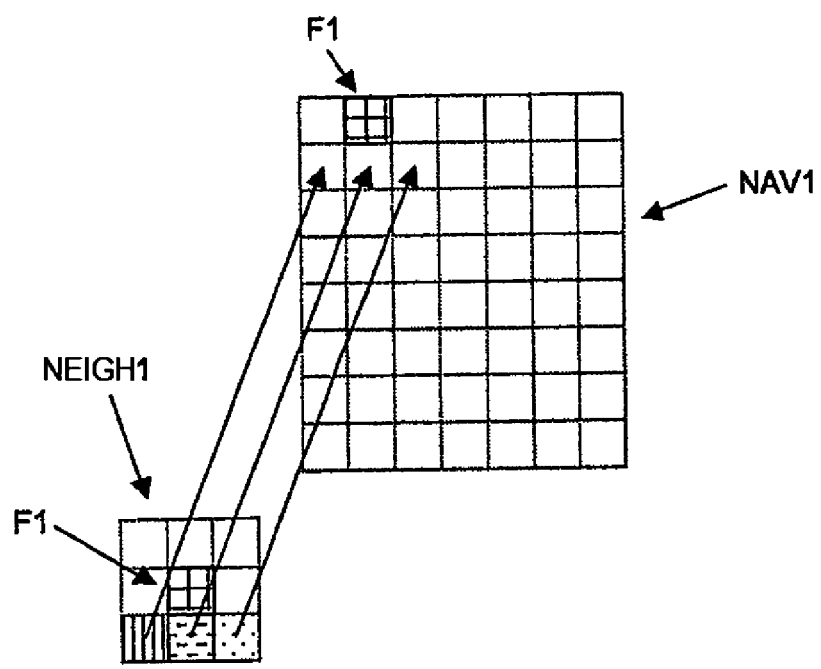
FIG. 14

DEVICE AND METHOD FOR EXTRACTING INFORMATION FROM A DATABASE, AND ASSOCIATED PRODUCTS

This application claims the benefit, under 35 U.S.C. §365 of International Application PCT/EP2004/053135, filed Nov. 26, 2004, which was published in accordance with PCT Article 21(2) on Jun. 16, 2005 in French and which claims the benefit of European patent application No. 03292999.4, filed Dec. 1, 2003 and n° 03 14843 filed Dec. 17, 2003.

FIELD OF THE INVENTION

The present invention relates to a device and a method for processing information of a database and to associated products.

BACKGROUND

Within a home network, each user has multimedia tools available which allow the interactive manipulation or processing of audio, video, graphic data etc. A television device, with high-level multi-mode processing specificities (sound, visual, graphic etc.), can thus be connected to an information processing system (processor, network) and also can be coupled with a PDA (Personal Digital Assistant). The latter offers a data processing and display quality which is clearly superior (processor, memory) to that of the television device.

Such a home network, in particular when it uses the IP (Internet Protocol) standard, therefore allows multimedia information to be sent within the home. It is linked to the outside world (to the Internet) via a gateway, the purpose of which is to manage the transition between the internal network space and the Internet space by readdressing the IP frames from the outside to the inside and vice versa. The home network possibly has an access point allowing the connection of devices, for example PDAs, via a wireless link (or several wireless links).

A user can, through a local application and by means of the abovementioned devices, choose films, music or other types of files or information in a remote database.

Such a database can however turn out to be extremely complex. For example, video-on-demand currently includes several thousand films, which can be as much as 300 000 units. Several methods of navigation in the databases are commonly used to take into account this variety:
  search a film by name;
  search several films by genres and categories/sub-categories; this solution imposes navigation in a tree structure and is not always to the user's satisfaction, as it is always restricted to navigation by themes and sub-themes without necessarily mastering the organization of the classification of the films; thus, there is a risk, for example, that he will not find a film that he would class among action films, in this same category;
  choose a film from a list; the system extracts a limited number of films (for example, the latest release, generally with a maximum of 100 films);
  in more advanced systems, a set of films is proposed according to the profile of the user (this profile has previously been described by a reference file or constructed from the choices registered in the database).

It would be advantageous to have available another solution which offers an attractive experience for the user. It may particularly be noted that most systems present films in text format or thumbnail image format (reduced image of the film poster). Yet, the thumbnail image only provides few elements with regard to understanding the film and the texts quickly become tiresome to read.

However, a system which is both attractive and effective generally requires considerable processing capabilities, since the database is large. Indeed, known techniques rely most frequently on sorting algorithms allowing the extraction of the desired data according to the criteria entered by users or derived from their profiles. Several finer selection steps are then necessary, repeating the sorting process using the information already obtained. Finally, as the users must restart searches with other criteria to refine or reorientate their approaches, the set of available data is generally sifted through several times before the user is satisfied.

SUMMARY OF THE INVENTION

The present invention relates to a device for processing information of a database which makes possible the user-friendly and efficient acquisition of data from the database and a requirement for only reasonable processing means even when the database is large.

The processing device of the invention can make the search for data of the databases containing a large amount of information more user-friendly with limited memory and processing expense.

The invention also relates to a method of processing information and a computer program which can offer the above advantages, as well as an audiovisual apparatus comprising a processing device in accordance with the invention.

The invention relates to the audiovisual field, on the understanding that the term audiovisual refers to audio and/or video applications. It particularly relates to apparatuses such as a television set, PDA, personal computer and mobile phone.

The field of the invention is particularly the coupling architecture of at least two audiovisual devices, which can significantly improve the interface between a user and these apparatuses, for access to information.

To this end, the invention relates to a device for processing information in a database, comprising:
  means for the automatic selection of data of the database according to selection criteria,
  and means for automatically arranging the selected data in a representation space provided for the attention of at least one user, this space comprising a plurality of positions which can receive elements that are representative of the data.
According to the invention, it comprises:
  means for pre-defining at least one related representation area within the representation space, formed by activated positions, this representation space including at least one complementary area having no data representation, formed by deactivated positions,
  means for specifying at least one data bootstrapping element for each related area,
  means for positioning the bootstrapping element at a bootstrapping position in the related area corresponding to this element,
  means for automatically and successively determining new data elements from data elements already positioned in the related area, in accordance with at least one proximity order relation based on contents of the data,
  and means for automatically and successively positioning the new data elements in the related area at positions neighboring the positions occupied by the data elements already positioned.

The selection means include the initial specification and successive determination means, and the arrangement means include the predefinition, bootstrapping element positioning and successive positioning means.

The term "automatic" means in this case that some at least of the operations carried out by the means in question are automatic.

However, the term "representation" covers visual representation, such as, in particular, a screen display, and/or auditory representation, such as, in particular, the audio transmission of information.

The terms "representation space" must be considered as being able to refer to not only a spatial space, but also of any other nature, for example based on the color dimensions sound and/or.

The processing device of the invention contrasts sharply with the known techniques as it relies upon close coupling of the use of the representation space and of the data elements which are placed there. Thus, it is known to arrange data in a spatial space (for example on a screen) according to the particularities of these data. The forms obtained naturally then result from the nature of the data. It is also known to place a data set in a predefined form, for example on a plane or a sphere.

However, the processing device of the invention uses predefined areas within a representation space, which contains in this manner both activated positions (filled boxes) and deactivated positions (empty boxes). It is thus possible to obtain all sorts of forms which are either predefined, random or possibly plotted by a user, for the presentation of data. The processing device of the invention gives meaning to such representations as a result of an iterative process of filling by neighborhood.

Such a technique may allow, with reduced calculating expense, the acquisition of results which are both attractive and extremely practical to exploit for a user.

Preferentially, the successive determination and successive positioning means are provided to:
 form neighborhood cards centered on the elements already positioned, each of the neighborhood cards centered on one of the elements already positioned giving elements neighboring this element in accordance with the proximity order relation,
 select said new elements from the neighboring elements,
 place them in the related area corresponding to the element already positioned at positions neighboring this element.

These neighborhood cards, which can also be the object of representations to users, are extremely practical for effectively determining the successive elements of the related areas.

The successive determination and successive positioning means are advantageously provided then to place these neighboring elements at positions relative to this element in the related area, which correspond to the positions relative to this element of the neighboring elements in the neighborhood card.

Furthermore, the successive determination and successive positioning means are advantageously provided to supply the neighborhood cards to representation means for the attention of the user.

Preferably, the successive determination means are provided to exclude from the new data elements, the data elements already positioned, so as to represent, at the most once, each of the data elements in the representation space.

According to a particularly ergonomic form, the successive determination and successive positioning means are provided to determine and position the new elements as and when there are selections by the user, in the representation space, of positions neighboring the positions occupied by the data elements already positioned.

Thus, the user can navigate in the representation space and gradually discover new elements neighboring those that he was already able to identify.

According to another form, all of the elements of the representation space are first determined in their respective positions, but they are only shown progressively to the user according to his selections.

Advantageously, the successive determination means are intended to use, for the proximity order relation, at least one of the relations based on: a number of identical terms in the contents, a number of similar terms for a predefined part of the contents, a difference in dates in the contents, a number of similar graphic patterns in the contents, and a number of similar sound patterns in the contents.

According to an advantageous bootstrapping method for the filling of the related area, the initial specification means are provided to specify the bootstrapping element according to a user profile.

The means for pre-defining the related area are advantageously provided to allow the user to construct this related area. According to other methods for defining the related areas, which can be combined with each other and with the preceding ones, these areas are randomly defined, by random selection from several predefined areas, by a user selection from several predefined areas, and/or by automatic selection according to a user profile.

In a particular specification method for the bootstrapping elements, the initial specification means are provided, in case of definition of several related areas by the predefinition means, to specify a first data bootstrapping element in one of the related areas, then to specify the other bootstrapping elements from the first bootstrapping element by means of the proximity order relation.

The invention also relates to an audiovisual apparatus, characterized in that it comprises a processing device in accordance with any one of the forms of the invention, this apparatus being preferentially chosen from a television set, a personal digital assistant and a personal computer.

The invention also relates to a method for processing information in a database, comprising the following steps:
 automatic selection of data from the database according to selection criteria,
 and automatic arrangement of the selected data, in a representation space provided for the attention of at least one user, this space comprising a plurality of positions that can receive elements that are representative of the data.

According to the invention, this method comprises steps of:
 predefining at least one representation related area within the representation space, formed by activated positions, the representation space comprising at least one complementary area at the related area without data representation, formed by deactivated positions,
 specifying of at least one data bootstrapping element for each of the related areas,
 positioning the bootstrapping element at a bootstrapping position in the related area corresponding to this element,
 automatically and successively determining new data elements from the data elements already positioned in the related area, in accordance with at least one proximity order relation based on contents of the data, and automatically and successively positioning new data elements in the related area at positions neighboring the positions occupied by the data elements already positioned.

The selection step includes the initial specification and successive determination steps, and the arrangement step includes the predefinition, bootstrapping element positioning and successive positioning steps.

This information processing method is preferentially implemented by means of an information processing device in accordance with any one of the forms of the invention.

The invention also relates to a computer program product comprising program code instructions for the execution of the steps of the information processing method according to the invention, when this program is executed on a computer. "Computer program product" means a computer program support, which can consist not only of a storage space containing the program, such as a diskette or a cassette, but also of a signal, such as an electric or optical signal.

BRIEF DESCRIPTION OF THE DRAWINGS

The invention will be better understood and illustrated by means of the following embodiments and implementations, which are in no way limiting, with reference to the appended figures in which:

FIG. 12 shows, for a first form of construction of a navigation card associated with level 1, the initial display of this card on one of the PDAs of FIG. 6, during the first step shown in FIG. 8;

FIG. 13 shows a randomly selected navigation table for the navigation card of FIG. 12, in the first construction form of the card;

FIG. 14 shows the navigation card corresponding to FIG. 12, in its initial filling stage

DETAILED DESCRIPTION

Figure 1:
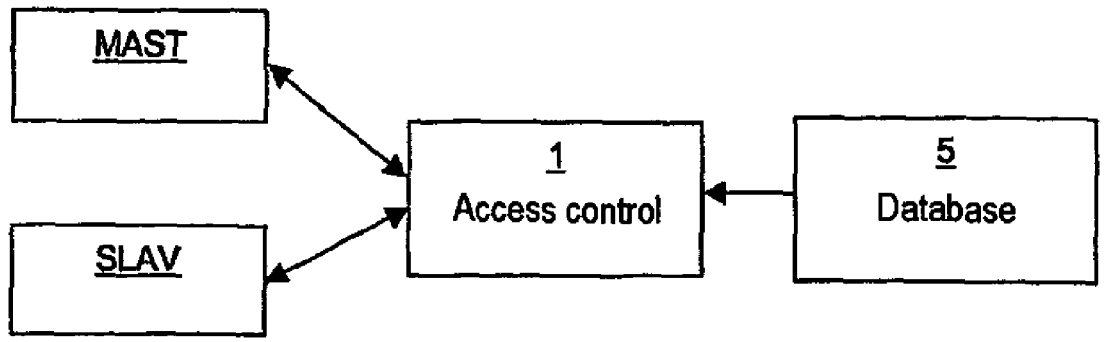
FIG. 1 is a block diagram showing a device for the control of access to a database, in accordance with the invention, in relation to a master apparatus and a slave apparatus.
Figure 2:
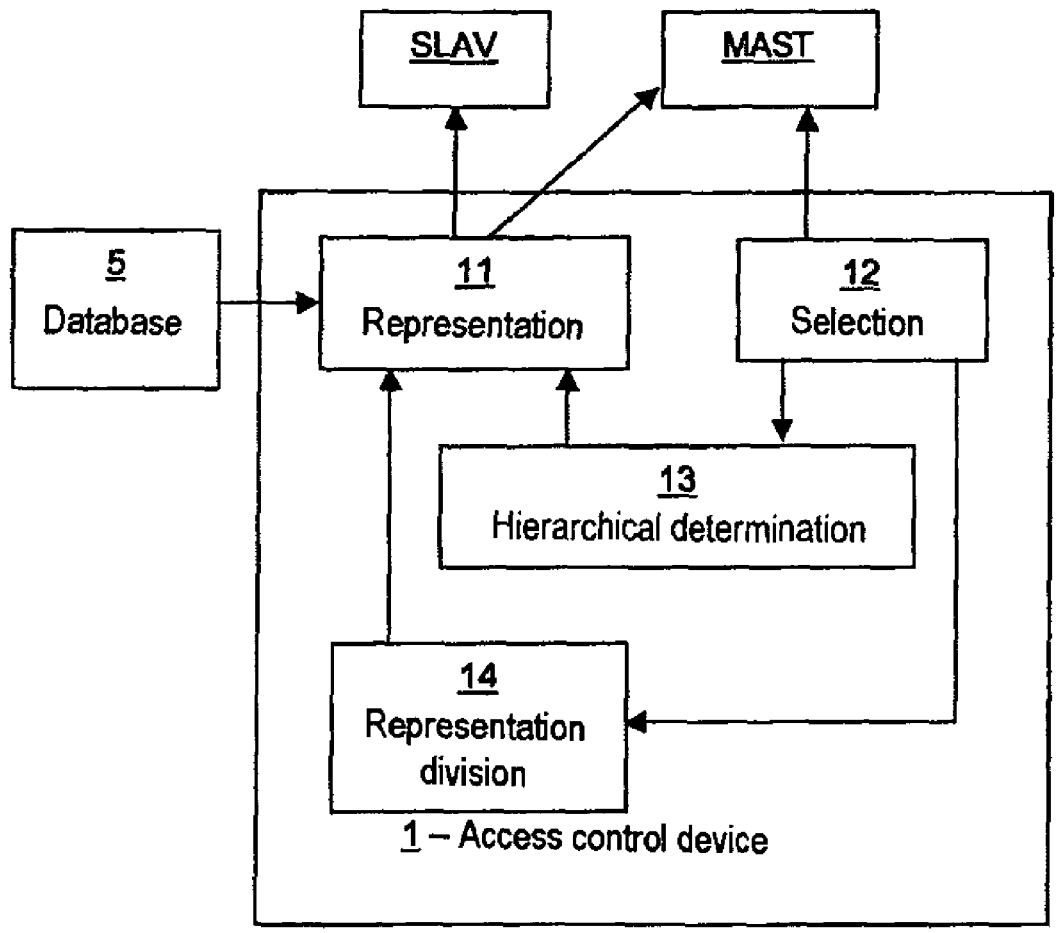
FIG. 2 functionally develops the content of the access control device of FIG. 1.
Figure 3:
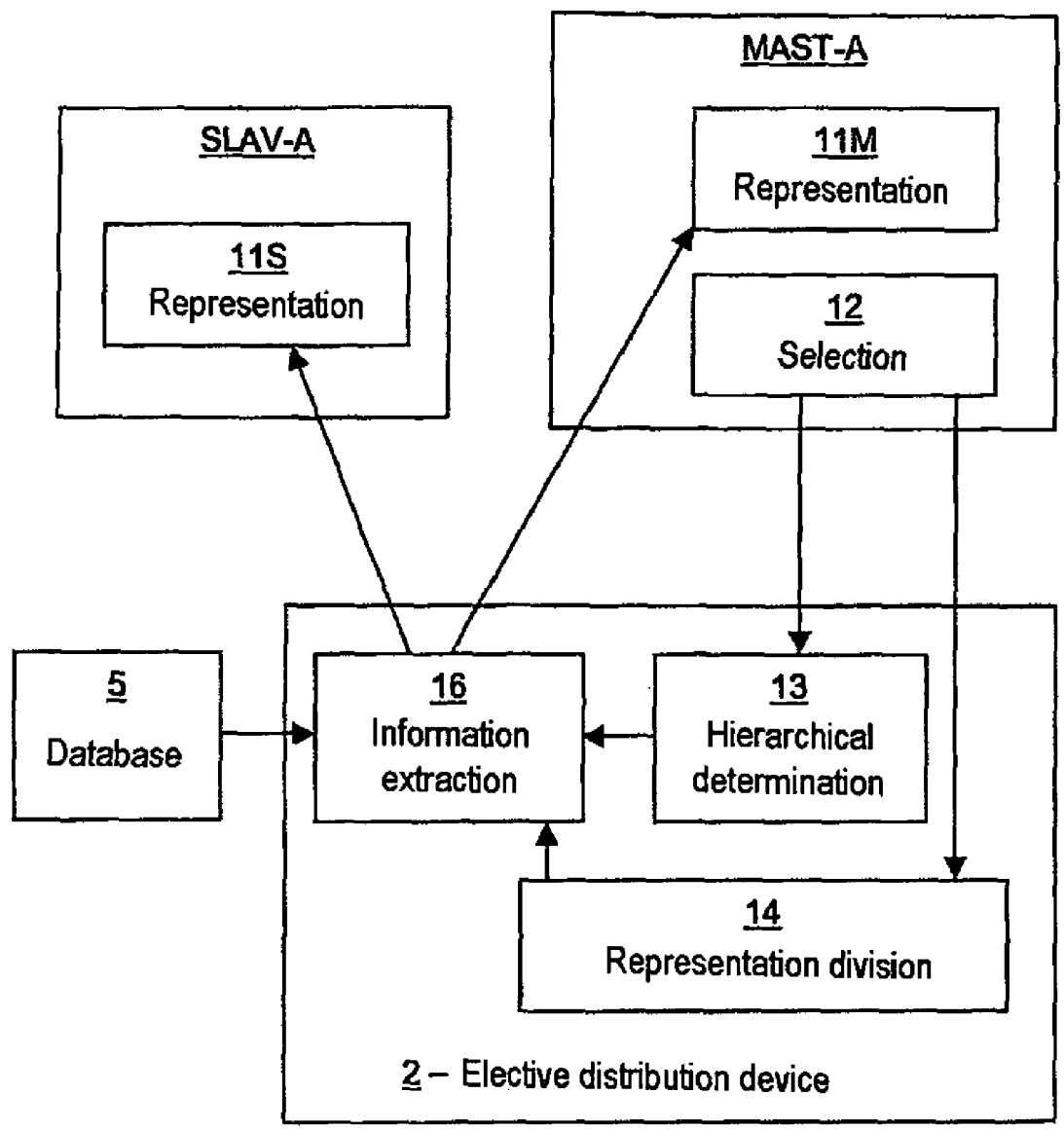
FIG. 3 illustrates a first embodiment of the access control device of FIGS. 1 and 2, based on a system which is independent in relation to the master and slave apparatuses.
Figure 4:
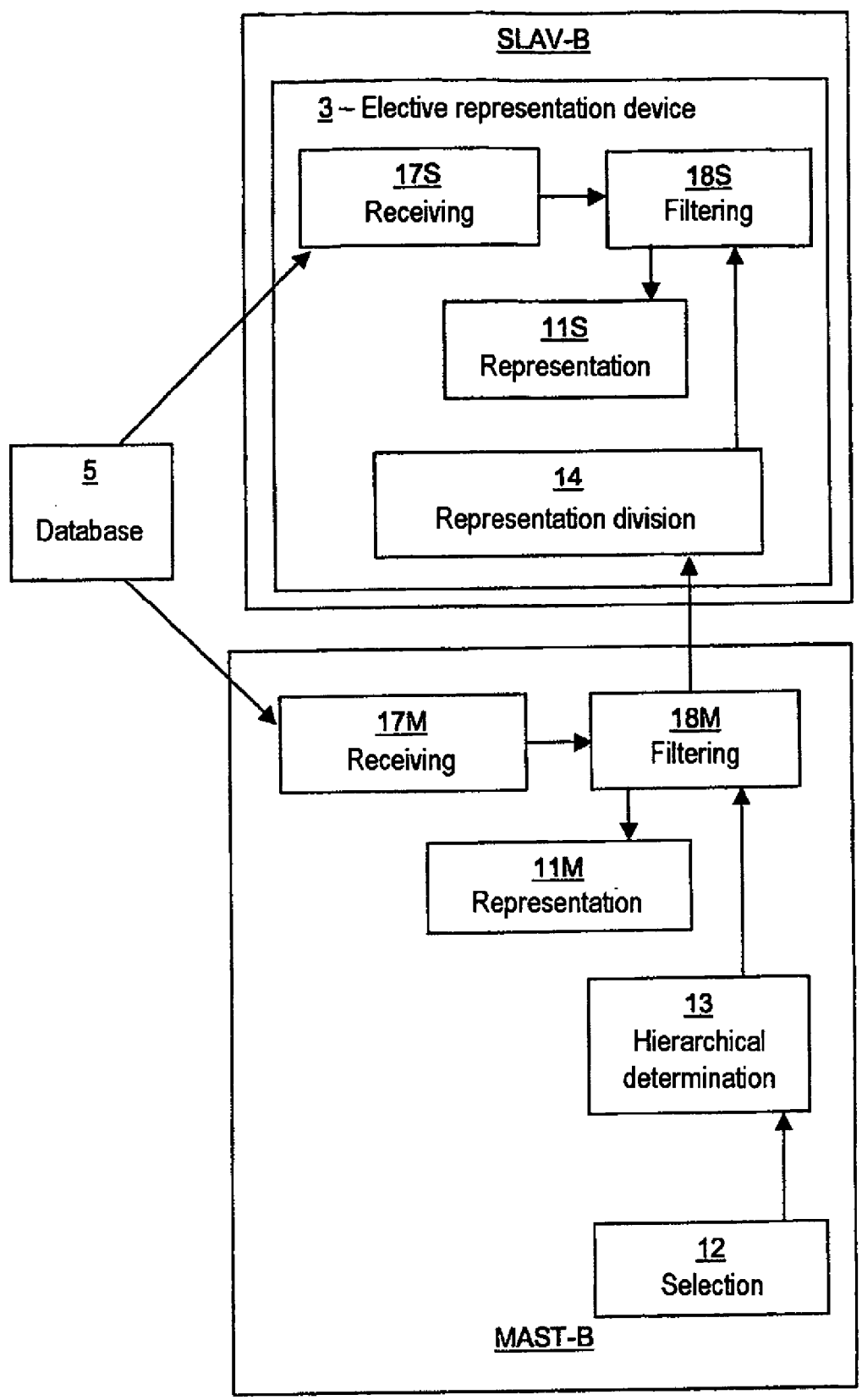
FIG. 4 illustrates a second embodiment of the access control device of FIGS. 1 and 2, based on a distribution of the functionalities of the access control device in the master and slave apparatuses, with functional predominance of the slave apparatus for the determination of the representations in the latter.
Figure 5:
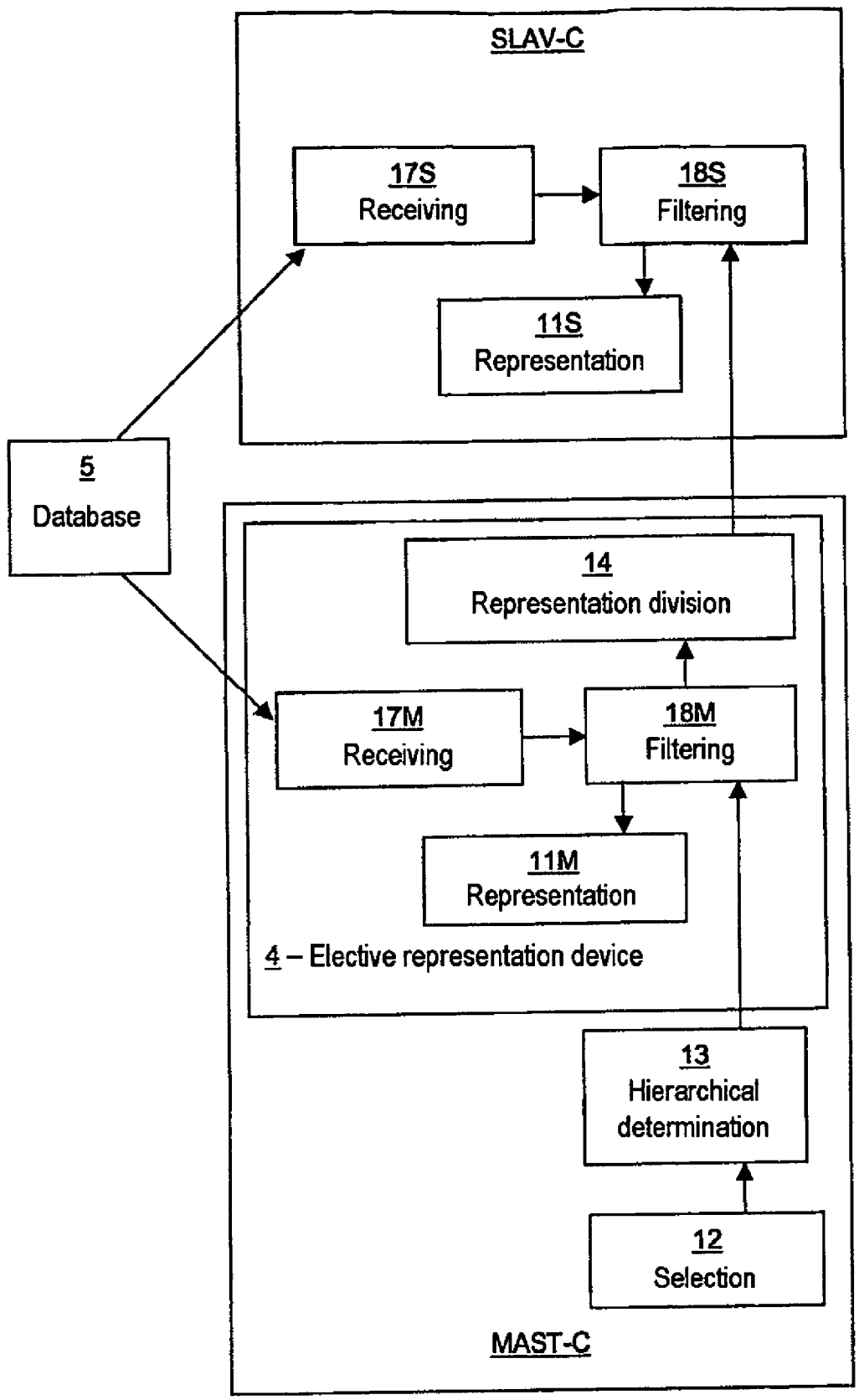
FIG. 5 illustrates a third embodiment of the access control device of FIGS. 1 and 2, based on a distribution of the functionalities of the access control device in the master and slave apparatuses, with functional predominance of the master apparatus for the determination of the representations in the slave apparatus.
Figure 6:
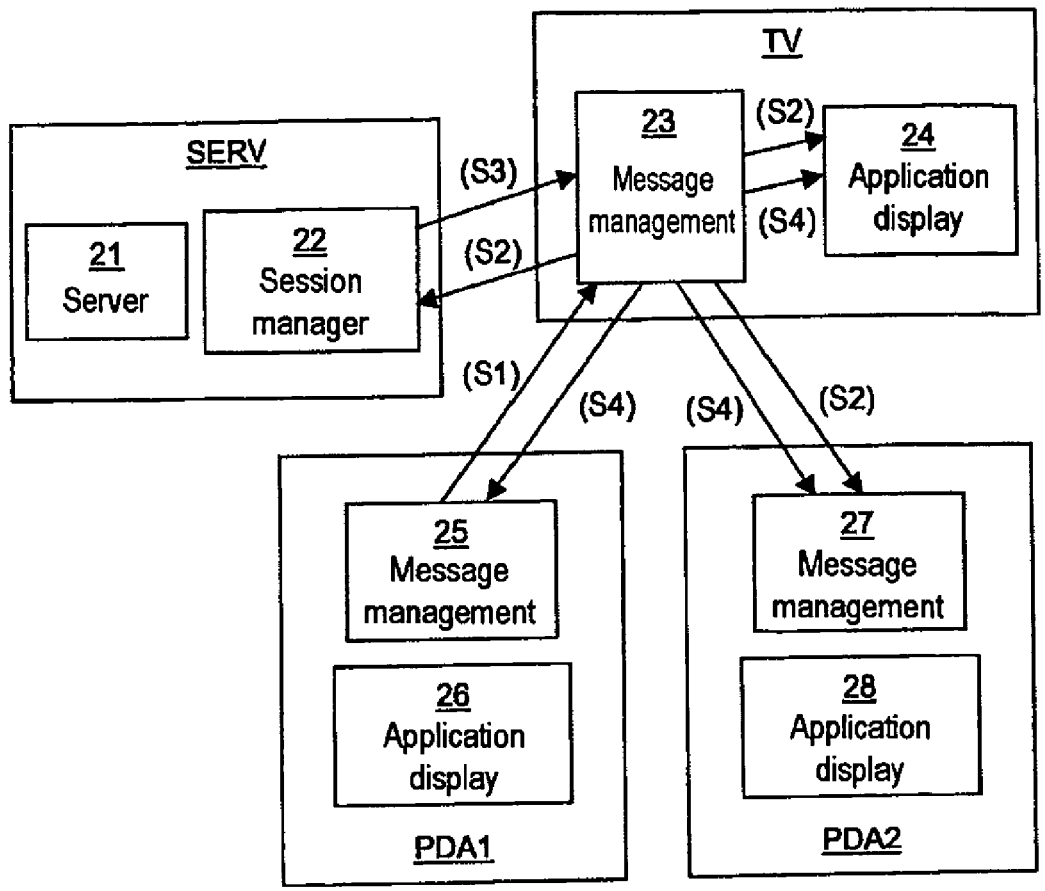
FIG. 6 is a block diagram of a VOD application architecture implementing a coupling architecture derived from the second embodiment of the access control device shown in FIG. 5, for a television set and two personal digital assistants.

In FIGS. 1-6 and 11, the modules shown are functional units, which can or cannot correspond to physically distinguishable units. For example, these modules or some of them can be grouped in a single component, or form functionalities of a same piece of software. A contrario, certain modules can possibly be composed of physically separate entities.

Moreover, in FIGS. 12 and 15-19 showing examples of representations on a PDA and television set, the dimensions of the elements of the cards are not to scale, but are chosen so as to facilitate reading and to clarify the disclosure.

An architecture for coupling audiovisual apparatuses (FIG. 1) uses a master apparatus MAST and a slave apparatus SLAV, the master apparatus MAST being able to control the functionalities of the slave apparatus SLAV. An access control device 1 governs the access of these two apparatuses MAST and SLAV to a database 5. Although this device 1 is shown external to the apparatuses MAST and SLAV, it can or cannot be totally or partially incorporated in one of these apparatuses or in them both. Its separate representation is therefore for the purpose of clarity in the disclosure, and must be interpreted in terms of functions that are either concentrated, or more or less distributed.

The access control device 1 particularly comprises (FIG. 2) a module for representation 11 of information from the database 5 in the apparatuses MAST and SLAV. The module 11 can represent at least three hierarchized levels of information LE1, LE2, and LE3 respectively of orders 1, 2 and 3 (the priority of the levels decreases with the order, the notation LE being adopted as generic). This representation is implemented visually, via screen display, and/or in an auditory manner, by sound transmission.

The representation of information of one of the levels is conditioned by a selection of data made in at least one other of the levels having a lower order. For example, the representation of level LE2 depends on the data selected at level LE1, while the representation of level LE3 depends on the data selected at level LE2 (and indirectly, on those selected previously at level LE1). A representation by default is however possible for at least one of the order levels greater than 1, insofar as certain data can play a central role in the order level immediately greater than that in progress. For example, it is possible that the information shown for level LE2 contains data which condition by default the information to show for level LE3. Only an explicit selection of data other than the latter will then modify the information of level LE3.

The representation module 11 is able to simultaneously show two separate levels of information in the master apparatus MAST and slave apparatus SLAV respectively. In association with the other functionalities of the control device 1, it allows users to have available a representation coupled between at least one lower order level in the master apparatus MAST and an upper order level (relative to that of the lower order) in the slave apparatus SLAV.

The access control device 1 also comprises:
- a selection module 12 allowing a user of the master apparatus MAST to select data in the levels of information, except in that of the highest order—here therefore in levels LE1 and LE2;
- a hierarchical determination module 13, able to determine the information to be represented for any one of the levels of information, except that of the lowest order (here LE1), according to the data selected by a user of the master apparatus MAST in at least the immediately lower order level; this module 13 thus allows the establishment, for each of the levels LE2 and LE3 to be represented in one of the apparatuses MAST or SLAV, of the information actually selected to be transmitted to users;
- and a representation division module 14, able to cause a double representation in the slave apparatus SLAV and the master apparatus MAST respectively; with a lower order level of information being shown in the master apparatus MAST, the division module 14 is provided to react to a selection of data by a user of this master apparatus MAST in this lower order level, while being able to immediately cause the representation of the level of information of the immediately greater order in the slave apparatus SLAV; the division module 14 can also bring about the representation of levels of information of orders greater by more than one unit than that in which the selection is effected in the master apparatus MAST, insofar as a selection by default is possible; moreover, the representation in the slave apparatus SLAV of higher order levels in no way excludes the simultaneous and joint representation in the same slave apparatus SLAV of lower order levels.

The access control device 1 can be implemented in relation to the master apparatus MAST and slave apparatus SLAV in various manners, some of which will be disclosed hereafter.

In a first embodiment (FIG. 3) for which the master and slave apparatuses are marked MAST-A and SLAV-A respectively, an independent elective distribution device 2 includes the hierarchical determination module 13 and the representation division module 14 of the access control device 1, as well as a module for extracting information 16 from the database 5. The information extraction module 16 is intended to extract the appropriate data for representations in the apparatuses MAST-A and SLAV-A, according to the information produced by the hierarchical determination 13 and representation division 14 modules.

The representation module 11 of the device 1 is split between two representation submodules 11M and 11S, present in the master apparatus MAST-A and slave apparatus SLAV-A respectively. The selection module 12 is integrated into the master apparatus MAST-A.

In this embodiment, an essential part of the processing intelligence is thus concentrated in an independent system (the elective distribution device 2) which can, for example, be integrated locally at the user's residence or arranged at a remote server. The slave apparatus SLAV-A has only traditional functions of representation using information communicated by the extraction module 16. The master apparatus MAST-A, apart from this representation function, also includes selection functionalities in the levels of information LE which are represented there.

According to a particular version, the extraction module 16 does not only send the appropriate data to the MAST-A and SLAV-A apparatuses, but also sends them in the desired form for display and/or sound transmission, furthermore incorporating therein interactivity data (for example according to the DVB-MHP (Digital Video Broadcasting—Multimedia Home Platform) standard) intended for selections in the master apparatus MAST-A. The roles of the apparatuses SLAV-A and MAST-A with regard to the access control are thus reduced, such that they can be made up of products generally available on the market, without requiring special adaptation.

In a second embodiment of the access control device 1 (FIG. 4), the functionalities of the latter are entirely split into the master and slave apparatuses, marked MAST-B and SLAV-B respectively. The master apparatus MAST-B integrates the selection 12 and hierarchical determination 13 modules, as well as a representation submodule 11M similar to that of the first embodiment.

Furthermore, it comprises a receiving submodule 17M responsible for receiving the information from the database 5 in view of selection of the data relevant for representation. A filtering submodule 18M has as a function the selection, from the data accessible in the database 5 via the receiving submodule 17M, of the information required for the representations. This filtering submodule 18M is particularly conditioned in its actions by the hierarchical determination module 13.

"Submodules" refer here, as above, to disassociated functionalities between the two apparatuses MAST-B and SLAV-B, and not to a physical sub-set of an entity. A receiving module 17 and a filtering module 18 can thus be defined, these modules being understood to group together the corresponding functionalities present in the two apparatuses MAST-B and SLAV-B respectively.

The slave apparatus SLAV-B comprises the representation division module 14, in communication with the filtering submodule 18M of the master apparatus MAST-B. It also includes representation 11S, receiving 17S and filtering 18S submodules having functions similar to those of the corresponding submodules in the master apparatus MAST-B. The representation 11S, receiving 17S and filtering 18S submodules form, with the representation division module 14, an elective representation device 3 particular to the slave apparatus SLAV-B.

This second embodiment can allow the avoidance of recourse to a specific device with adaptation of the master MAST and slave SLAV apparatuses used. These adaptations are preferably based on software additions.

In a third embodiment (FIG. 5), the functionalities of the access control device 1 are, as in the second embodiment, split between the master and slave apparatuses, marked MAST-C and SLAV-C respectively. However, the representation division module 14 is integrated here in the master apparatus MAST-C, and not in the slave apparatus SLAV-C.

Thus, the slave apparatus SLAV-C includes the representation 11S, receiving 17S and filtering 18S submodules, while the master apparatus MAST-C comprises, apart from the selection 12 and hierarchical determination 13 modules, an elective representation device 4 particular to the master apparatus MAST-C, which includes the representation division module 14, and the representation 11M, receiving 17M and filtering 18M submodules. Furthermore, the filtering submodule 18S of the slave apparatus SLAV-C receives instructions from the representation division module 14 of the master apparatus MAST-C.

In this embodiment, the software additions are essentially concentrated in the master apparatus MAST and can be substantially reduced in the slave apparatus SLAV.

In an alternative, the role of the slave apparatus SLAV is reduced again, the master apparatus MAST itself carrying out the filtering and representation preparation operations allowing the determination of the content and the presentation of the data to be represented by the slave apparatus SLAV. The result of these operations can be communicated in the form of instructions for access to the database 5, for example in the form of interactive data in DVB-MHP format. It thus becomes possible to use only a standard apparatus with interactive functions for the slave apparatus SLAV, the software additions being exclusively made in the master apparatus MAST.

A VOD software architecture (FIG. 6) uses XML language (extendible Markup Language) from the point of view of the representation of the data and commands exchanged between the different apparatuses. The latter are made up in the disclosed example of a television set marked TV and two PDAs designated by PDA1 and PDA2 respectively. These apparatuses are attached to processors 24, 26 and 28 respectively which are responsible for interpreting the data and generating displays relating to the latter. They also include message managers, marked 23, 25 and 27 respectively.

The application can process local, internal home network or remote data, produced by an Internet server external to the home network or accommodated at a service provider. Generally, the data is thus available at a server assembly SERV comprising a server 21, as well as a session manager 22 which can manage each application session involving the server 21 (local or remote).

The apparatuses PDA1 and PDA2, referred to as master apparatuses, send commands to this server 21, which takes into account the requests and sends back data accordingly. Any message sent to the server 21 or received from the latter passes via the message manager 23 connected to the TV, referred to as the slave apparatus. This manager 23 sends back all of the messages received from the server 21 or the master apparatuses PDA1 and PDA2 which are connected thereto. Thus all of the elements involved in the application receive all the actions and results launched on the network. In this manner, each of the apparatuses is aware of all of the network activity of the application and configures itself according to the mode in which it must act. Therefore, this embodiment is related rather, in substance, to the second embodiment (FIG. 4) described above.

Figure 7:
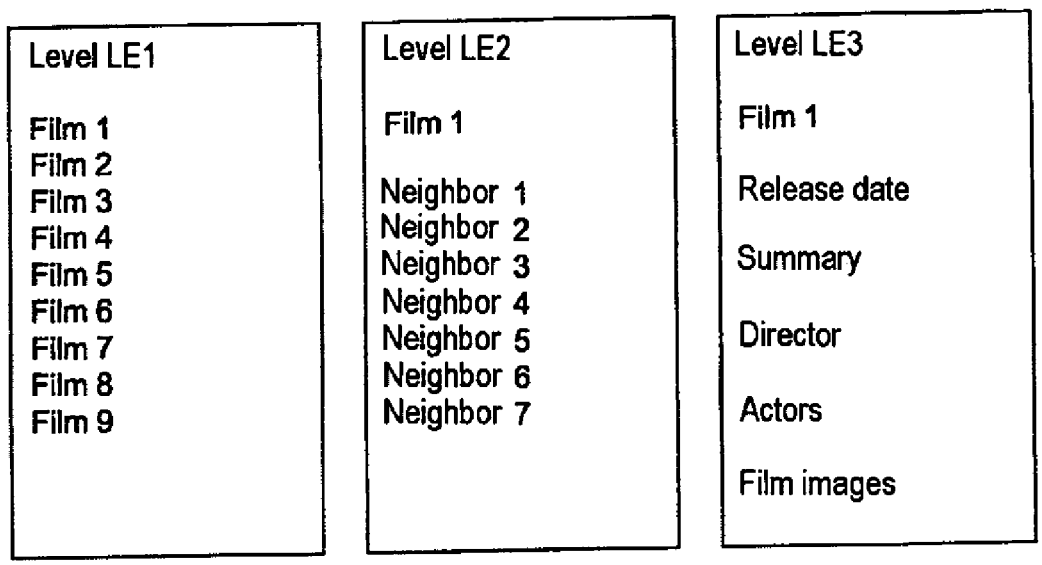
FIG. 7 shows three hierarchized levels of information used in the coupling architecture of FIG. 6.

By way of illustration (FIG. 7), three levels LE of information can be distinguished: a first level LE1 allowing users to schematically show film indicators and carry out a selection thereat; a second level LE2 showing, for each selected film, films neighboring the latter (according to the criteria explained hereafter); and a third level LE3 giving various information on the selected film.

One of the master apparatuses (PDA1 or PDA2) sends, for example, the request for a new "deal" of films. This message is transmitted to the slave apparatus (step S1 of FIG. 6) which transmits it first to the server 21, then to the other PDAs which may be connected (step S2). Each is informed that there will meet an event since an action has been launched. When the results are sent back by the server 21 (step S3), they pass via the slave apparatus (TV), which sends them in turn to all of the masters (PDAs, step S4). Each configures itself in accordance with the application. In the case of the VOD, the apparatuses, including the TV (at the first interface state it presents the level LE1 of the application), construct the VOD card received.

When one of the PDAs requests a "zoom" on a film, it sends a corresponding command to the server 21. Once the response is sent back, the slave apparatus TV decides to process the information of levels LE2 and LE3 (details of the film and neighborhood). The first master apparatus which has transmitted the action and the second master apparatus also receive this information but do not process it since they remain at level LE1.

Figure 8:
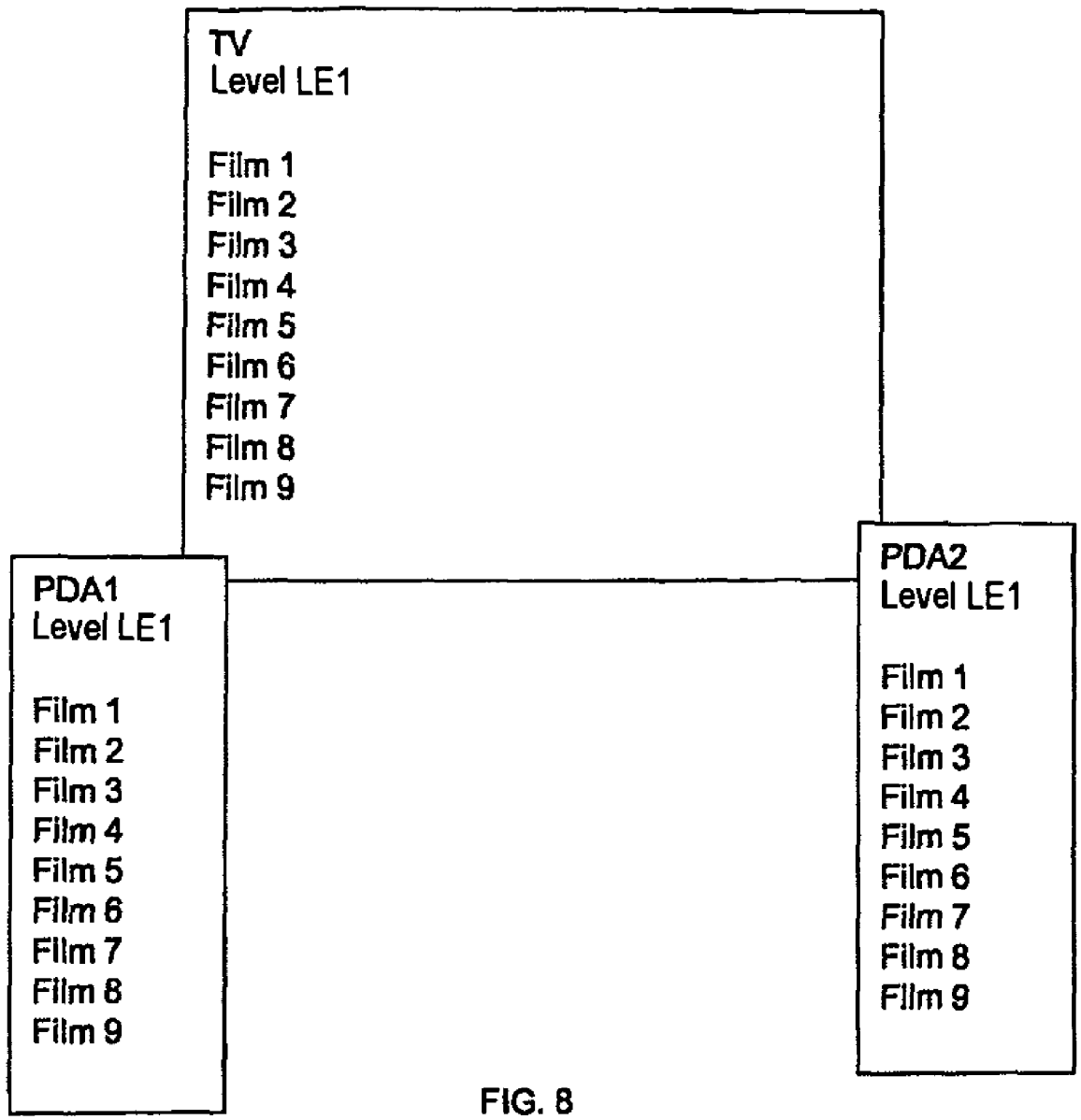
FIG. 8 shows a first step for using the coupling architecture of FIG. 6, consisting of a deal of level 1 for all the apparatuses.
Figure 9:
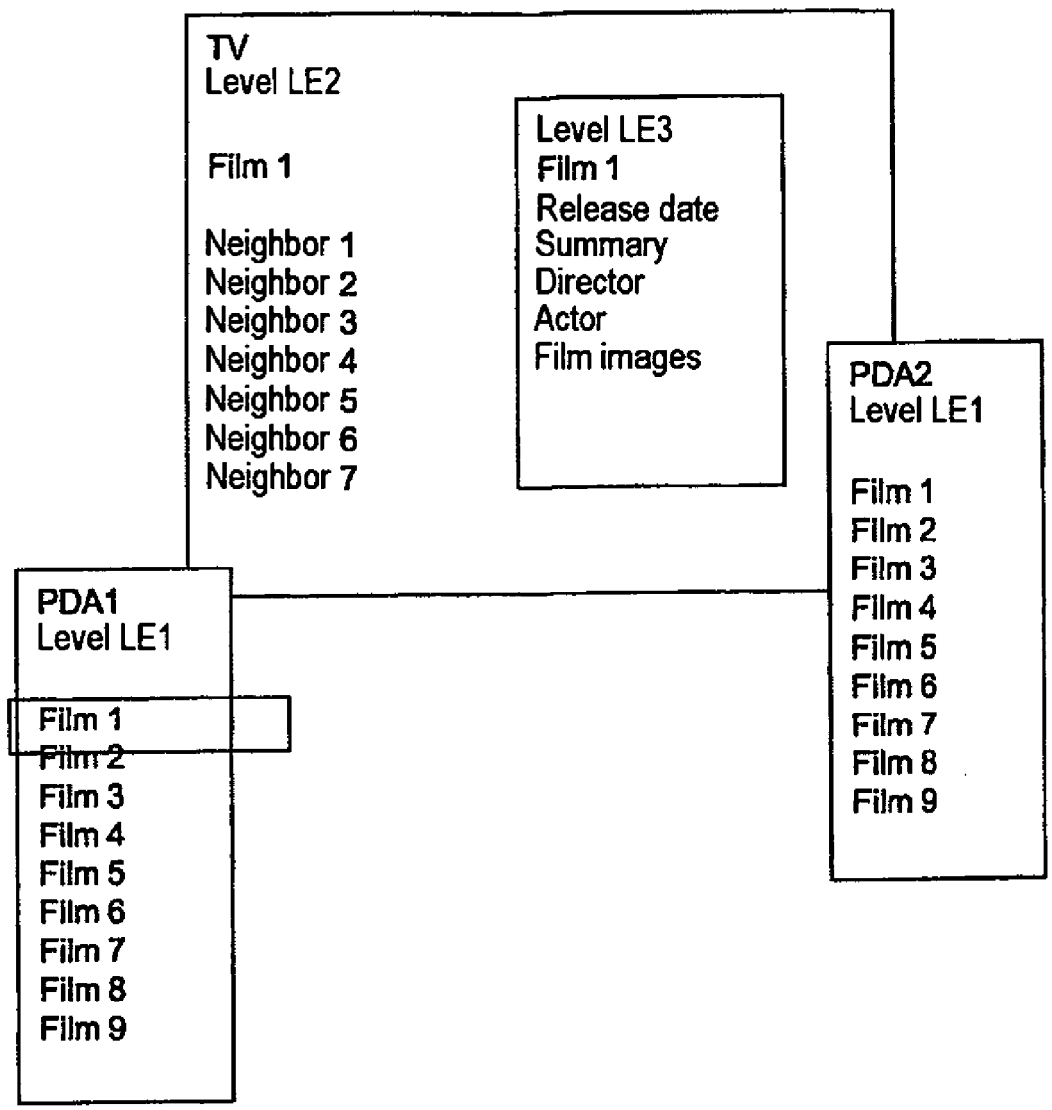
FIG. 9 shows a second step for the use of the coupling architecture of FIG. 6, consisting of a selection of a film in level 1 by one of the PDAs of FIG. 6.
Figure 10:
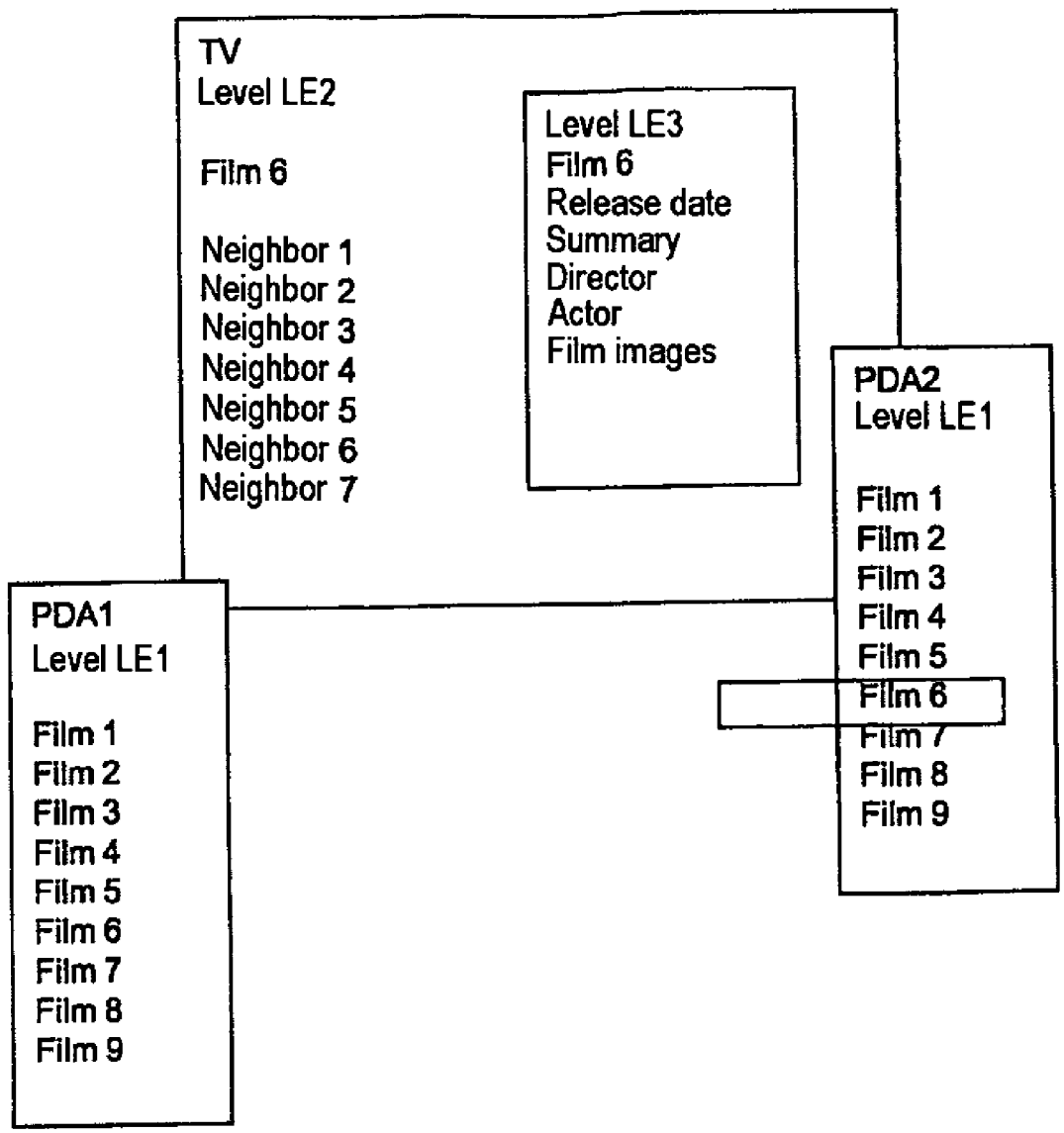
FIG. 10 shows a third step for the use of the coupling architecture of FIG. 6, consisting of a selection of a film in level 1 by the other PDA of FIG. 6 than that used in the step of FIG. 9.
Figure 11:
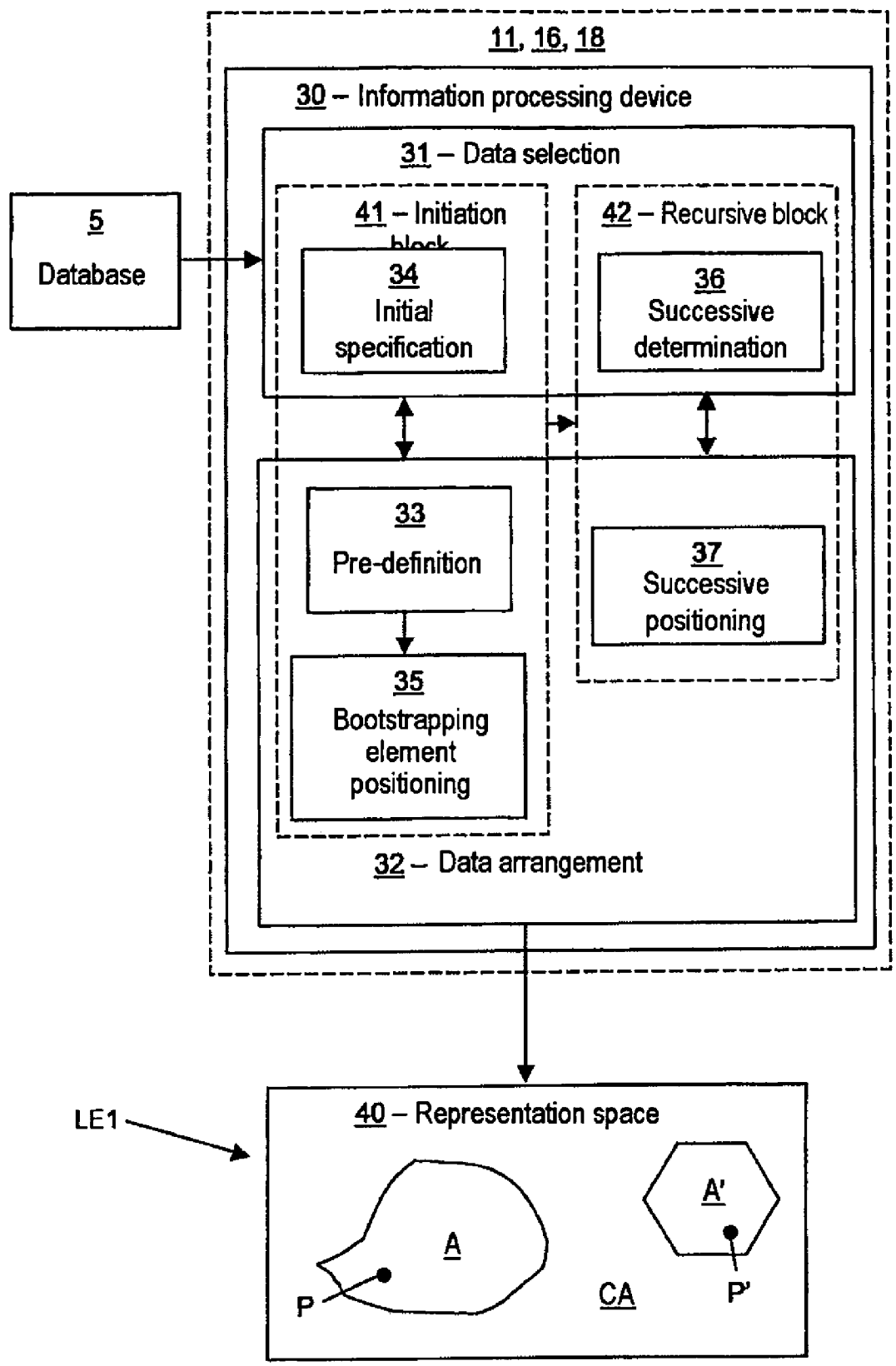
FIG. 11 is a diagram of a device for the extraction of information in a database, which can be used particularly for the constitution of the representations of level 1 in the coupling architecture of FIG. 6.

For example, the three apparatuses firstly receive a deal of films according to level LE1 (FIG. 8). A user of the apparatus PDA1 then selects a film, the film 1 (FIG. 9). Then a user of the apparatus PDA2 selects another film, the film 6 (FIG. 10).

In particular embodiments, each of the PDAs incorporates a pointing device allowing a user to interact with the displayed graphical elements, and the interfaces of the apparatuses use the UPnP (Universal Plug and Play) service. For example, in this PDA, a java language program acts as a UPnP control point and communicates with a Flash function reader to govern the user interface. Furthermore, the PDAs preferably incorporate video control capabilities according to the MPEG (Moving Picture Experts Group) 4 standard, which allows interactivity to be integrated in the video.

The mode for navigating the data shall now be detailed in several embodiments. Three different types of cards which can be displayed on the screen can be distinguished, some of which correspond respectively to several levels LE of information. In the embodiments disclosed hereafter, the three levels of information LE1, LE2 and LE3 described above are used, associating the first level LE1 with navigation cards NAV and the second level LE2 with neighborhood cards NEIGH.

A particularly judicious device 30 for processing information of the database 5 (FIG. 11) for the representations of level LE1 can be incorporated in the representation 11, extraction 16 and/or filtering 18 module of the embodiments disclosed above. This processing device 30 essentially comprises a module 31 for selecting data in the database 5, and a module 32 for arranging the data selected for the attention of users, in a representation space 40.

In the examples illustrated here, the representation is visual, such that the space 40 is spatial. Furthermore, it has in this case two dimensions, corresponding to a screen display. However, the spatial space can also have three dimensions (embossed), or possibly one only (visualization line), although the advantage with the latter would then be quite limited.

Furthermore, a similar technique can be applied particularly to an auditory representation, the space then being sound (for example, sound transmission of the information in two dimensions, comprising a note-pitch first dimension and a melodic second dimension, with possible progressive development according to each of these dimensions).

A combination of several heterogeneous dimensions may also be envisaged, for example a space with four dimensions comprising two spatial dimensions, a color dimension and a sound dimension.

In any case, the space 40 is delimited so as to be entirely accessible to a user, and is provided explicitly for the attention thereof. It comprises a plurality of positions which can receive elements representative of the data of the database 5. These positions correspond to a discretization of the space 40 according to its dimensions. The arrangement module 32 is therefore provided to position, in some of these positions, elements representative of the data selected by means of the selection module 31.

The selection 31 and arrangement 32 modules comprise several units for acting in cooperation during each representation to the user. Thus, the arrangement module 32 comprises in particular a unit for pre-defining 33 at least one related representation area within the space 40. This area or these areas (areas A and A' in the illustrated example) comprise activated positions among the positions of the space 40, which are intended to receive data elements. They only cover part of the space 40: the rest form at least one complementary area (area CA in the illustrated example) of deactivated positions among the positions of the space 40, which are intended to receive no data element.

The predefinition unit 33 can be produced according to various modalities, including a random definition, a plotting of areas by a user, an area selection by a user from different available areas, etc.

The selection 31 and arrangement 32 modules comprise, respectively, a unit for initially specifying 34 at least one bootstrapping data element for each of the related areas A and A', and a unit for positioning 35 these bootstrapping elements respectively at bootstrapping positions P and P' of the related areas A and A'. These bootstrapping elements, for example which are obtained according to a user profile, form starting points for the filling of the related areas A and A'. The pre-definition 33, initial specification 34 and positioning 35 units together form an initiation block 41.

In the selection module 31, a unit for successively determining 36 new data elements can extract data from the database 5, using elements already positioned in the related areas A and A'. This unit 36 extracts the data in accordance with at least one proximity order relation based on contents of this data. A unit for successively positioning 37 the new data elements which are thus determined, places these elements at positions not yet occupied in areas A and A', at positions neighboring the positions occupied by the data elements already selected. It is in this manner that the progressive filling of the related areas is carried out little by little, with the proximity order relation as the driving force. This iterative process converges with the end of the filling of all of the related areas (or possibly, in a case which is of little advantage, with the exhaustion of data). The successive determination 36 and successive positioning 37 units together form a recursive block 42.

Several examples mentioned below enable the comprehension of various modalities of such an order relation. The latter is closely linked to the very contents of the data, and is applied in an iterative manner. It allows for the classification of all of the data elements in relation to any one thereof, with it being possible for several elements to assume the same proximity level. For example, if the data elements relate to music, the order relation relative to a reference music (element already positioned) classifies the music according to the number of common notes, or possibly transposed common agreements, or common melodic strings of at least three notes which are possibly transposed, with this reference music.

In a particular embodiment with visual representation in two dimensions, the system establishes the navigation cards NAV on the basis of tables TAB which allow the graphical construction thereof. According to one modality of this embodiment, the navigation cards NAV are constructed beforehand in the space, their contents being generated by the system in the course of implementation and adapted at the request of a user.

In a restricted display space such as the PDA, only 20 lines of text can be displayed. Using the card system based on a grid of 10×10 elements, 100 films can be presented. Each navigation card NAV is coded by means of a navigation table TAB composed of "1" and "0" as in the following example:

```
0 1 1 0 0 0 0 1 0 1
0 1 1 1 1 0 0 1 0 1
1 1 1 1 1 0 0 1 0 1
0 0 0 1 1 0 1 1 1 1
0 0 1 1 1 1 1 1 1 1
0 0 0 1 1 1 0 1 1 1
0 0 0 1 1 1 1 1 0 1
1 1 0 1 1 1 0 1 0 1
0 0 1 1 1 1 0 1 0 1
0 0 0 1 1 1 0 1 0 1
```

The "0" indicates that no element must appear at the associated place in the display grid, while "1" indicates that an element may be found there. Each element represents a film, marked in the navigation card NAV associated with the table TAB in the form of a colored square indicating its genre.

Each navigation mode uses this type of data navigation card NAV. According to a random mode, N films are proposed to the user (N being equal to the number of "1" in the table TAB), which are selected randomly from the database but taking into account constraints disclosed hereafter. The user can at any moment have a new random navigation card NAV, based on a new table TAB.

Furthermore, the system randomly chooses the navigation table TAB from a set of "pre-drafted" tables, for example 10 or 20. This table TAB serves as a support for the presentation of the information. In the example described, it changes at each random request. Thus, the user can change from the preceding data, as he immediately realizes that a new selection has taken place and that it is very different to the previous one.

The prior organization of the navigation card NAV by means of the table TAB allows the consolidation of the interface system in a coherent reading mode. The squares, representing the films, are not placed randomly on the screen. They favor, firstly, better distribution which increases reading and interpretation comfort. This representation borrows, moreover, an analogy from the game of Scrabble or dominos. The user thus believes to be in free and instinctive navigation of the database, while in reality this navigation depends on the pre-constructed navigation cards NAV.

The cartographic system is therefore used as a "path" for navigation in the database of films. In a particular embodiment, each film is attached to eight neighbors. Put in place then are neighboring relations in a cardinal orientation mode, in the form of neighborhood cards NEIGH such as the following:

| Neighbor1 | Neighbor2 | Neighbor3 |
| Neighbor8 | Film Y | Neighbor4 |
| Neighbor7 | Neighbor6 | Neighbor5 |

These neighborhood cards NEIGH are firstly used to fill the navigation card NAV and secondly are used for the representations of the second level LE2.

The neighborhood relations are based on an algorithm which allows the classification of the films according to an analogy link with the film Y. According to several particular embodiments, the algorithm is based on the number of common terms in the titles of the films, a number of common actors, differences in production years and/or a semantic analogy of the film summaries (for example the number of identical or similar terms, except common words to be excluded from the computation). There is thus established an order relation in the films other than the film Y which is determined in relation to this film Y and can include several films at each level of analogy with Y. The eight neighbors, Neighbor1 to Neighbor8, relate respectively to the eight films having the closest analogy with Y, classified in decreasing order according to the order relation used.

One particular algorithm case which allows the establishment of an order relation based on a semantic analysis is described in document EP-A-1365583.

The navigation card NAV can be used by the system on the basis of these neighborhood relations to propose to the user a selection of films drawn from pre-established paths, as described hereafter. There thus develops a cartography which progresses with the gradual addition of neighbors, constructing an extremely dense network of films "corresponding" with each other.

For a given navigation card NAV to be filled (on the basis of a table TAB), the system selects firstly a film, randomly from the global database or from a set extracted according to the user profile. This film forms an entry point in the card NAV, and allows the marking of one of the squares. Using this initial film and following the indications of the navigation table TAB with "0" and "1", the user progressively chooses which neighbors are presented by means of the neighborhood cards NEIGH. For example, if the navigation table TAB indicates that it is necessary to take the neighbor "EAST" (on the left) of the film Y in the diagram above, the film "Neighbor8" of the neighborhood card NEIGH is selected and presented at the place where the table TAB defined it.

By way of illustration, the entry point of the table TAB is the first non-zero element of the upper line, moving from left to right. The position of the element "Film Y" (in bold and italics) thus forms a starting point, and the navigation table TAB indicates that only the west, southwest and south neighbors (underlined below) be taken:

```
0 1 1 0 0 0 ...
0 1 1 1 1 0 ...
...
```

The system then uses the neighborhood card NEIGH centered on the film Y, extracting the neighbors concerned:

|  |  |
|---|---|
| *Film Y* | Neighbor4 |
| Neighbor6 | Neighbor5 | and positions them in the navigation card NAV.

Then, the system carries on its action by continuing the reading of the navigation table TAB. It chooses one of the neighbors and repeats the same operation. It therefore begins by searching for the neighbors of the latter and reads the navigation table TAB which indicates thereto which are displayed (this cartographic system is used to direct searches in the database). The path constructed by the table TAB "differentiates" the selection in the database according to a mode said to be "random", which provides a sort of "nomadic" route (the user takes directions at random in the neighborhood relations).

By way of example, the neighbor chosen after Y is Neighbor4. Then a neighborhood card NEIGH centered on Neighbor4 is constructed and based on the chosen algorithm, excluding a priori from the database of available data, those already retained for the navigation card NAV (i.e. here Y, Neighbor5 and Neighbor6). Then the films associated with "1" are positioned, in this case only the southeast neighbor.

This implementation allows the progression from a random extraction to a random path in a neighborhood system. Thus, the navigation card NAV obtains a locally dominant coloring, the element "Film Y" often having, but not necessarily, neighbors of the same genre. The squares, representing the films and their genres, therefore often have the same color in a local view of the card, but changes in color can meet from one neighbor to the other. If one neighbor is of another genre, it also establishes a neighborhood dominated by this new genre, in its local space formed by the neighborhood card NEIGH.

As indicated above, the repetition of films is preferably avoided on the navigation card NAV, by eliminating from the list of available films those already selected beforehand, as the card is progressively filled.

Furthermore, in an advantageous embodiment, each neighborhood card NEIGH with the exception of the first (associated with the initial element) incorporates not only the element from which a neighborhood must be established (central element), but also the neighboring elements already known, previously used for the passage in the navigation table TAB. These elements are arranged then at their respective positions with regard to the navigation card NAV, the neighborhood card NEIGH being represented in this form on the screen.

In the previous example, the element Neighbor4 already has its west (Y), southwest (Neighbor6) and south (Neighbor5) neighbors, and the only ones missing are therefore its five other neighbors to obtain the neighborhood card NEIGH to be used and represented. Finally, only one of its neighbors (the southeast neighbor) is used to fill the navigation card NAV.

The operations relating to the representations in a PDA (master apparatus MAST) and a television (slave apparatus SLAV) will now be detailed via embodiments, using navigation NAV (level LE1) and neighborhood NEIGH (level LE2) cards, as well as specific information INFO on chosen films (level LE3). The representations of the cards on the PDA and the television are identified by the terms PDA and TV in brackets, respectively.

The user of the PDA serving as a master apparatus requires the selection of a navigation card NAV. The infrastructure NAV0(PDA) of such a card (FIG. 12) is then processed on the PDA in the form of a square assembly of 8×7 elements, which themselves are in the form of small squares representative of films. The PDA then randomly selects a navigation table TAB1 (FIG. 13) formed by "1" (meaning presence of films) and "0" (not shown in FIG. 13, meaning absence of films) from various available tables.

For the filling of the navigation card NAV1 associated with the table TAB1 (FIG. 14), the PDA firstly automatically selects a film F1 from the database, which it positions at the first encountered "1", sweeping the lines from top to bottom and from left to right (in this case the second square of the first line). Then, the PDA constructs a neighborhood card NEIGH1 of 3×3 elements which is centered on this film F1 by means of a neighborhood algorithm, and positions in the card NAV1 the films corresponding to the elements identified by "1" on the table TAB1.

Figure 15:
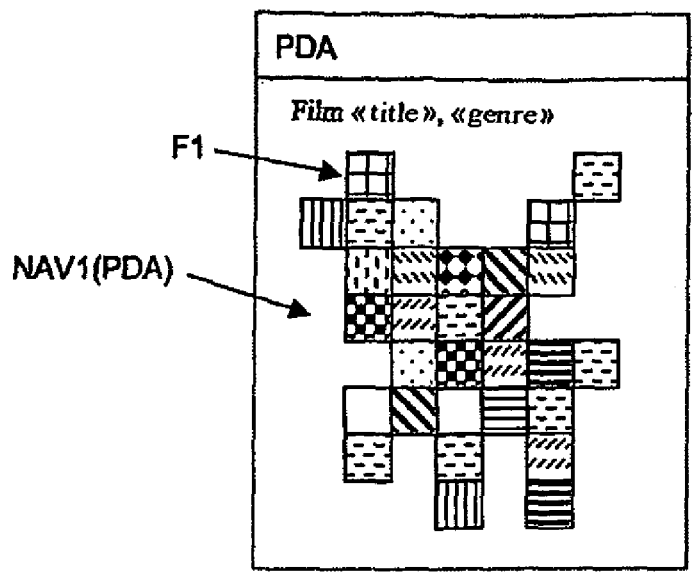
FIG. 15 shows the complete display of the navigation card on the PDA of FIG. 12, during the first step shown in FIG. 8.

The PDA repeats these operations gradually, successively centering the neighborhood cards NEIGH1 on different neighbors. It thus ends in a complete navigation card NAV1 (PDA) which is displayed on the PDA (FIG. 15).

Figure 16:
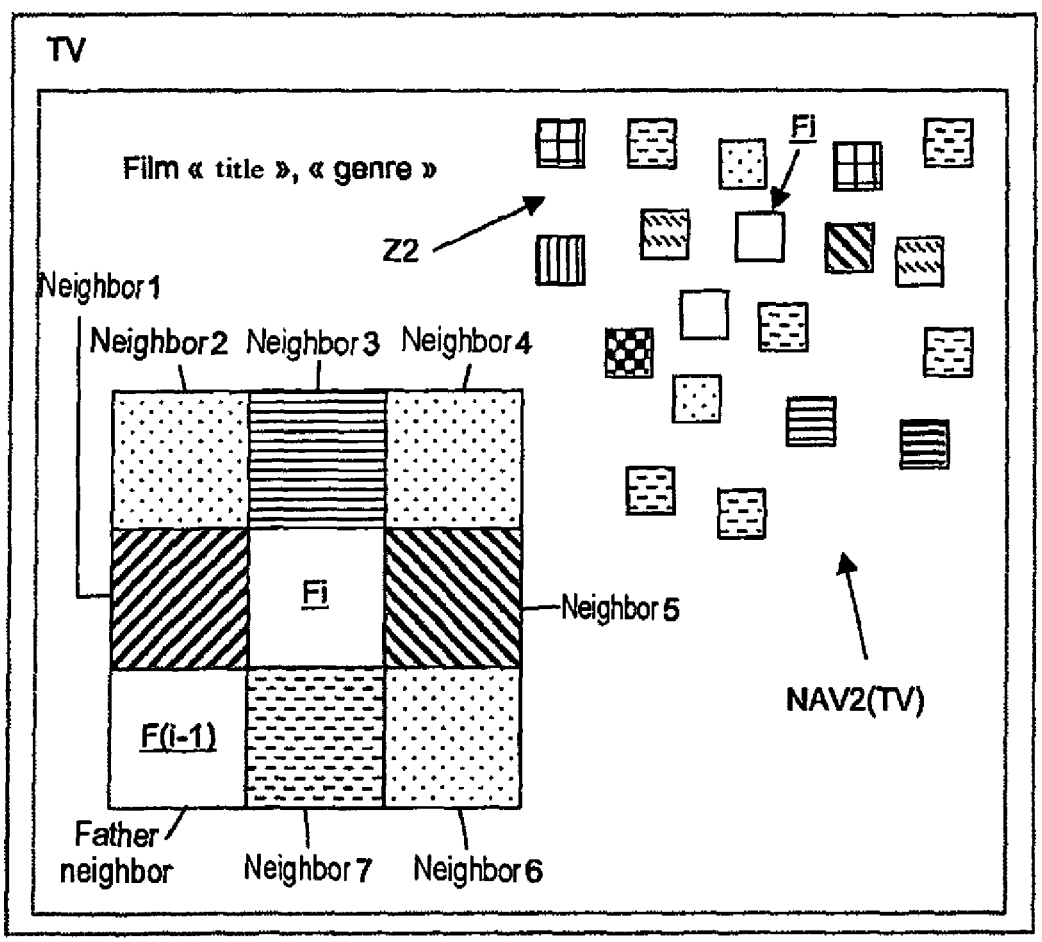
FIG. 16 shows the display of levels 1 and 2 on the television set of FIG. 6 after selection of one of the elements of the navigation card displayed on the PDA of FIG. 15 by a user, during the second step shown in FIG. 9.

Another illustrative example allows comprehension of the additional display types shown on the PDA serving as a master apparatus, and on the TV serving as a slave apparatus. When a navigation card NAV2 is displayed on the PDA in a similar manner to the card NAV1 (of FIG. 15), this card NAV2 is immediately shown on the TV, in fragmented form NAV2 (TV) (FIG. 16).

The TV display does not however consist merely of this information of level LE1 which is already present on the PDA, but also includes a representation of level LE2 showing a neighborhood card NEIGH2(TV). This card NEIGH2, determined in a similar manner to the card NEIGH1 mentioned above, is centered on a film Fi which is that on which the user of the PDA is positioned. At this stage, however, the user has not yet effected any film selection in the navigation card NAV2.

The card NEIGH2 also includes a film F(i–1) (called "father film") positioned before the film Fi during the construction of the navigation card NAV2, and from which the film Fi was obtained by neighborhood relation.

Figure 17:
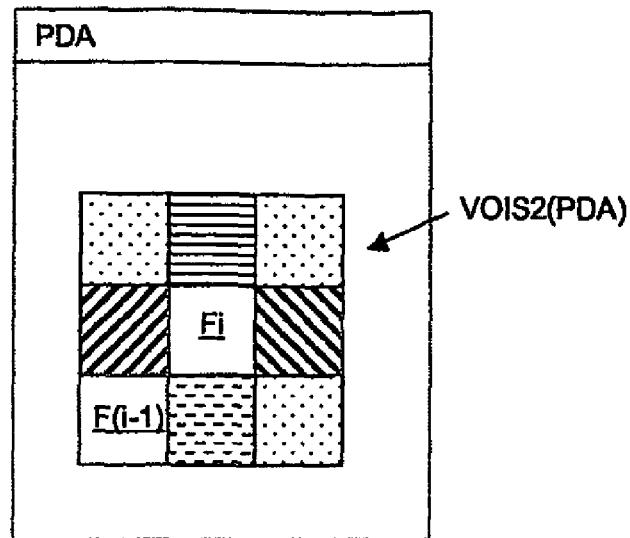
FIG. 17 shows the display of a neighborhood card associated with level 2 after selection of an element in the navigation card, on the PDA of FIG. 15.
Figure 18:
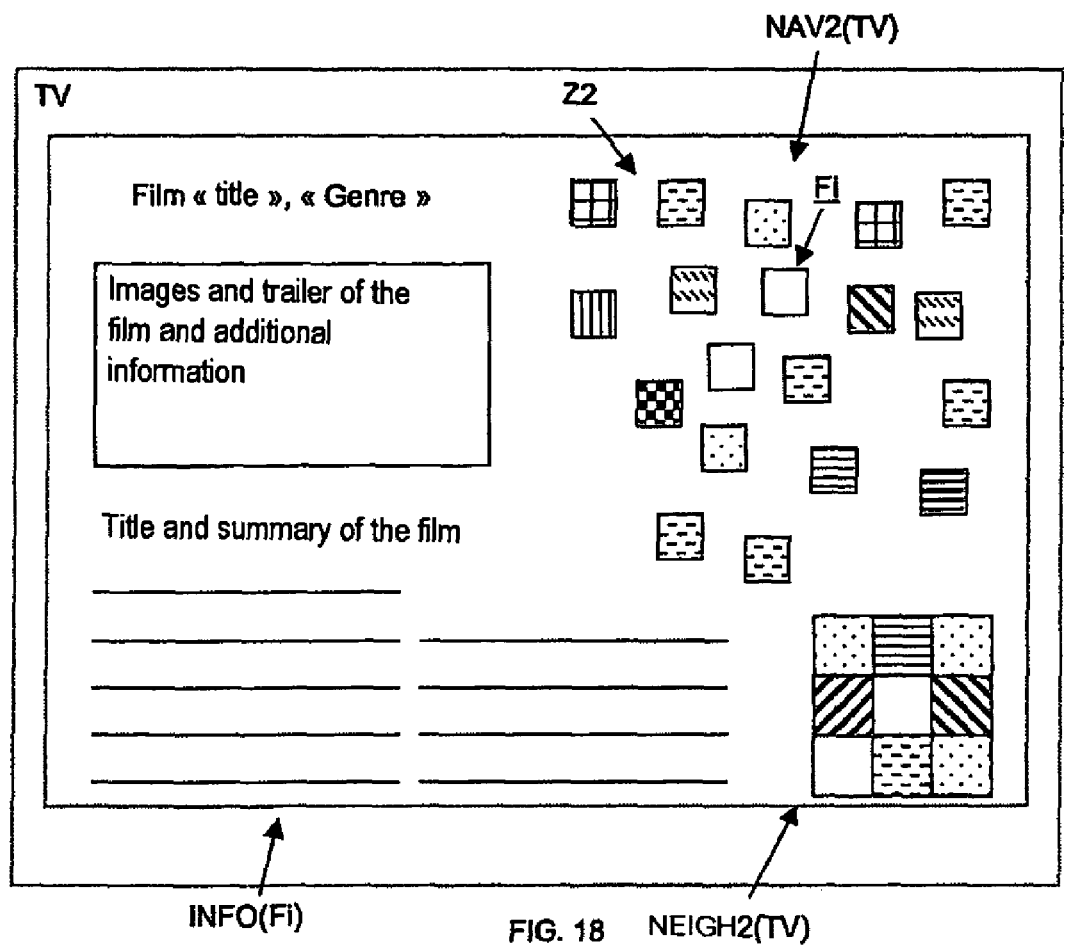
FIG. 18 shows the display of levels 1, 2 and 3 on the television set of FIG. 6, after selection of one of the elements of the neighborhood card displayed on the PDA of FIG. 17 by a user.
Figure 19:
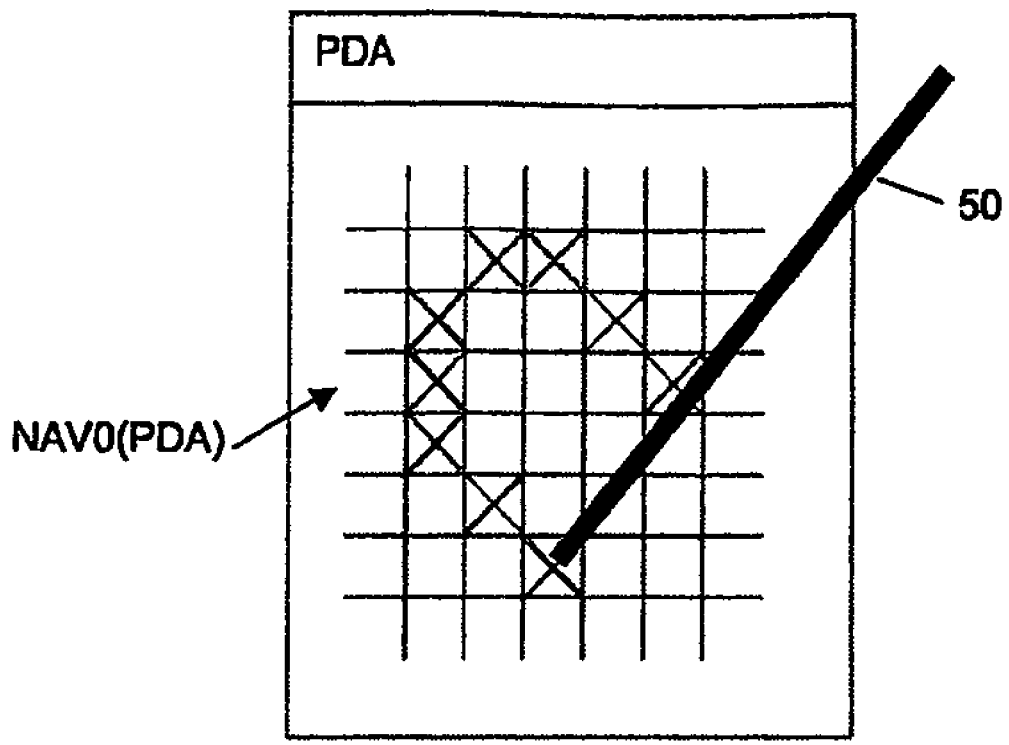
FIG. 19 shows, for a second construction form of a navigation card associated with level 1, the display of this card on one of the PDAs of FIG. 6 in the course of the form being plotted by a user, during the first step shown in FIG. 8.

When the user of the PDA actually selects a film from the neighborhood card NAV2(PDA), for example the film Fi, the neighborhood card NEIGH2(PDA) is displayed on the PDA (FIG. 17). The display on the TV is in this case automatically modified (FIG. 18) to include not only the navigation card NAV2(TV) and the neighborhood card NEIGH2(TV) associated with the selected film Fi, but also information INFO(Fi) relating to the film Fi. This information INFO of level LE3 is established by default, since they are directly derived from the choice of the user of the PDA at level LE1.

When the user of the PDA is then positioned on any one of the films of the neighborhood card NEIGH2(PDA), the information INFO is adapted to be representative of this film.

In the system, cards other than the navigation NAV and neighborhood NEIGH cards are also used. These cards have fixed forms and propose a static mode for interpretation of the data. Thus, a "Past" card stores the extractions made previously by the user in the database and processed via transmission of the corresponding films—by way of illustration, this card has a pyramidal form (for example 8 elements at the base, 2 at the top and 4 in height). A "Future" card contains indicators of films that the user wants to see later—by way of illustration, it has a square form (for example 5×5 elements).

According to a particularly advantageous embodiment, an embossment of the elements of these "Past" and "Future" cards is possible according to temporal indications required by the user. For example, a list of months of the year is displayed opposite these cards, and allows the user to select one of the months to see the films which have already been watched ("Past" card) or to be watched ("Future" card) during this month.

In this type of card, no "topological" relation is established, the squares representative of the films being juxtaposed one beside the other (therefore grouped together graphically) according to the actions of the user. The chosen representation is not based on the "Scrabble" type paths, but on rectangular or pyramidal structures, reminiscent of a more stable and fixed construction.

In a second method for determining the navigation table TAB, the latter is chosen beforehand by the user from various available cards—i.e. from various forms plotted on the screen and then represented by "1".

According to a third method for determining the navigation table TAB, the user draws a form on the screen, for example with a PDA by means of a stylus or by selection of boxes on a grid. This form, analyzed by the system and after possible conversion for recovering the selected points, defines the navigation card NAV (the parts plotted being associated with "1", and the others with "0").

Figure 20:
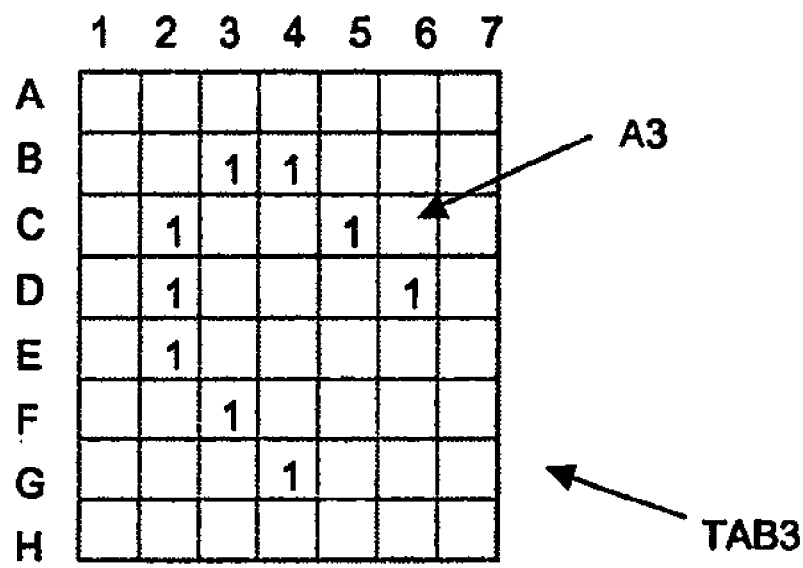
FIG. 20 shows a navigation table built for the navigation card of FIG. 19 from the plot made by the user, in the second construction form of the card.

Thus, to take up the example of a PDA as a master apparatus (FIG. 19), a user uses a stylus 50 to make a selection on a grid associated with the blank infrastructure NAV0(PDA) of the navigation card NAV. The system analyzes this plot and converts the selected points, thus producing (FIG. 20) a navigation table TAB3 comprising an area A3 of "1" derived from the plot, and provided to receive the films.

The system is more particularly suited to the use of navigation cards NAV based on a single related form of "1" in the associated navigation table TAB. However, in alternative embodiments, each navigation card NAV can comprise several related forms, without contact there between. In this case, a film is for example chosen at the start for each of the related forms of the navigation table TAB, then used to fill this related form gradually, in the same manner as disclosed above. In one particular version, the data chosen initially for these starting points have themselves an analogy link with each other. For example, they are interlinked by a neighborhood relation based on the same algorithm as that used to fill the related forms.

Although the above disclosure focused on the use of a slave apparatus SLAV for one or more master apparatuses MAST, other embodiments involve several slave apparatuses (such as several television sets) for one or more master apparatuses (for example PDAs).

The invention claimed is:

1. A device for processing information in a database, comprising:
   a processor configured to:
   select data of the database according to selection criteria,
   arrange selected data in a representation space provided for the attention of at least one user, the representation space comprising a plurality of positions which can receive data elements that are representative of the selected data,
   pre-define at least one related representation area within the representation space, formed by activated positions,
   specify at least one data bootstrapping element for each of the related representation areas,
   position the data bootstrapping element at a bootstrapping position in the related representation area corresponding to the data bootstraping element,
   successively determine new data elements from at least a data element already positioned in the related representation area, in accordance with at least one proximity order relation based on contents of the selected data,
   and automatically and successively position at least a part of the new data elements in the related representation area, at positions neighboring the positions occupied by the data elements already positioned, if these positions are not already occupied by data elements already positioned, the positions of said new data elements being randomly defined by the device for processing information at each user request;
   wherein the processor is further configured to use, for the proximity order relation, at least one of the relations based on: a number of identical terms in the contents, a number of similar terms for a predefined part of the contents, a difference in dates in the contents, a number of similar graphic patterns in the contents, and a number of similar sound patterns in the contents.

2. The device as claimed in claim 1, wherein the processor is further configured to form neighborhood cards centered on the data elements already positioned, each of the neighborhood cards centered on one of the data elements already positioned giving data elements neighboring the data element in accordance with the proximity order relation, and to select the new data elements from the neighboring data elements and to place them in the related representation area corresponding to the data element already positioned at positions neighboring the data element.

3. The device as claimed in claim 2, wherein the processor is further configured to place the neighboring data elements at positions relative to the data element in the related representation area, which correspond to the positions relative to the data element of the neighboring data elements in the neighborhood card.

4. The device as claimed in claim 2, wherein the processor is further configured to supply the neighborhood cards to representation means for the attention of the user.

5. The device as claimed in claim 1, wherein the processor is further configured to exclude from the new data elements, the data elements already positioned, so as to represent, at the most once, each of the data elements in the representation space.

6. The device as claimed in claim 1, wherein the processor is further configured to determine and position the new data elements when there are selections by the user, in the representation space, as positions neighboring the positions occupied by the data elements already positioned.

7. The device as claimed in claim 1, wherein the processor is further configured to specify a data bootstrapping element according to a user profile.

8. The device as claimed in claim 1, wherein the processor is further configured to allow a user to construct the related representation area.

9. The device as claimed in claim 1, wherein the processor is further configured to specify a first data bootstrapping element in one of the related representation areas, then to specify the other data bootstrapping elements from the first data bootstrapping element by the proximity order relation.

10. An audiovisual apparatus, comprising:
a selecting unit configured to select data of the database according to selection criteria,
an arranging unit configured to arrange selected data in a representation space provided for the attention of at least one user, the representation space comprising a plurality of positions which can receive data elements that are representative of the selected data,
a pre-defining unit configured to pre-define at least one related representation area within the representation space, formed by activated positions,
a specifying unit configured to specify at least one data bootstrapping element for each of the related representation areas,
a positioning unit configured to position the data bootstrapping element at a bootstrapping position in the related representation area corresponding to the data bootstrapping element,
a determining unit configured to successively determine new data elements from at least a data element already positioned in the related representation area, in accordance with at least one proximity order relation based on contents of the selected data,
a processor configured to use, for the proximity order relation, at least one of the relations based on: a number of identical terms in the contents, a number of similar terms for a predefined part of the contents, a difference in dates in the contents, a number of similar graphic patterns in the contents, and a number of similar sound patterns in the contents, and
a processing circuit configured to automatically and successively position at least a part of the new data elements in the related representation area, at positions neighboring the positions occupied by the data elements already positioned, if these positions are not already occupied by data elements already positioned, the positions of said new data elements being randomly defined by the device for processing information at each user request.

11. A method for processing information in a database, comprising:
selecting data from the database according to selection criteria,
arranging the selected data, in a representation space provided for the attention of at least one user, the representation space comprising a plurality of positions that can receive data elements that are representative of the data,
pre-defining at least one representation related area within the representation space, formed by activated positions,
specifying at least one data bootstrapping element for each of the related representation areas,
positioning the data bootstrapping element at a bootstrapping position in the related representation area corresponding to the data element,
successively determining new data elements from at least a data element already positioned in the related representation area, in accordance with at least one proximity order relation based on contents of the data,
using, for the proximity order relation, at least one of the relations based on: a number of identical terms in the contents, a number of similar terms for a predefined part of the contents, a difference in dates in the contents, a number of similar graphic patterns in the contents, and a number of similar sound patterns in the contents, and
successively positioning of at least a part of new data elements in the related representation area at positions neighboring the positions occupied by the data elements already positioned, if these positions not be already occupied by data elements already positioned, the positions of said new data elements being randomly defined for processing information at each user request,
wherein said selecting data includes the specifying and successive determining, and the arranging includes the pre-defining, positioning the data bootstrapping element and successive positioning.

12. A non-transitory computer-readable medium storing a computer program, which, when executed by a computer, causes the computer to perform the method as claimed in claim 11.

* * * * *